United States Patent [19]

Bennice

[11] 4,083,041

[45] Apr. 4, 1978

[54] GROUND CIRCUIT MONITOR

[75] Inventor: Richard L. Bennice, Danielson, Conn.

[73] Assignee: InterRoyal Corporation, New York, N.Y.

[21] Appl. No.: 685,956

[22] Filed: May 13, 1976

Related U.S. Application Data

[63] Continuation of Ser. No. 533,100, Dec. 16, 1974, abandoned.

[51] Int. Cl.² ............................................. G08B 21/00
[52] U.S. Cl. ......................................... 340/255; 5/68; 361/50; 361/77
[58] Field of Search ................ 340/255, 256; 269/325, 269/328; 5/63, 66, 68; 317/18 A, 18 B; 361/50, 77

[56] References Cited

U.S. PATENT DOCUMENTS

| | | | |
|---|---|---|---|
| 3,426,342 | 2/1969 | De Langis | 340/255 |
| 3,766,434 | 10/1973 | Sherman | 317/18 A |
| 3,996,496 | 12/1976 | Volk, Jr. | 340/256 X |

FOREIGN PATENT DOCUMENTS 727,966  4/1955  United Kingdom .............. 317/18 A

OTHER PUBLICATIONS

The C-D Capacitor; vol. 22, No. 1; Jan. 1957; pp. 4, 5; Cornell-Dubilier Electric Corp., Hamilton Blvd., So. Plainfield, N. J.

Primary Examiner—John W. Caldwell, Sr.
Assistant Examiner—Daniel Myer
Attorney, Agent, or Firm—Arthur A. March

[57] ABSTRACT

An electric hospital bed system including a conducting frame and movable parts, an electric device for controlling the movements of the movable parts and a ground circuit monitor operatively connected between a power supply source and the electric device. The monitor continuously senses the integrity of the ground connection between the hospital bed system and the building ground bus-bar, including the ground line in the wall outlet. In the event the ground connection is broken or disconnected for any reason, the power supply to the electric device will be interrupted and switched to a warning device mounted in the hospital bed system or at a remote central monitoring station. The hospital bed system remains inoperative until the ground fault is located and the ground connection restored.

12 Claims, 4 Drawing Figures

GROUND CIRCUIT MONITOR

This is a continuation, of application Ser. No. 533,100 filed on Dec. 16, 1974, now abandoned.

FIELD OF THE INVENTION

The present invention relates to a hospital bed system having a ground circuit monitor adapted to sense the integrity of the ground connection between the bed frame and the electric power supply source.

More particularly, this invention relates to an electrical monitor system which is responsive to an extremely low control current passing through the frame of a hospital bed system and through the ground connection so that should the ground wire become open, the power supply to the components of the electric hospital bed will be interrupted.

BACKGROUND OF THE INVENTION

As is well known, potential electrical hazards exist in practically all patient care environments. Electrically controlled beds and even innocuous devices such as bedside lamps, electric heaters, call buttons and the like are sources of potentially lethal electrical current. Furthermore, high current electrical shock (Macroshock) applied through intact skin, such as through the hand when grasping or touching an unsafe electrical device, constitutes a constant potential danger in the event there is inadequate grounding. Inadequate grounding might be the result of poor equipment design, a broken ground wire in the power cord or power plug, or simply the result of an improperly wired wall outlet.

If an electrical hospital bed is properly designed and connected to a properly wired wall outlet, leakage currents will be conducted harmlessly to ground. Normally, the bed frame is connected through the third wire in the power plug to the ground of the electrical system. Such a ground connection is a safety feature to prevent accidental shock to patients or medical personnel.

However, in the event of an internal circuit defect in the components of the hospital bed, voltage may appear on the metal bed frame and will attempt to ground through the third wire. If the ground wire is broken or disconnected either accidentally or intentionally, the voltage can no longer return to ground, resulting in a troublesome situation. The voltage will now seek a return path to ground through the body of any person in contact with the bed frame or instrument. This situation is particularly dangerous if the person is also in contact or touching any grounded metal surface as a water pipe, radiator or other instrument, or is standing on a damp floor because the resultant shock may cause great injury and even death.

The use of isolation transformers has been suggested as a method of reducing the electrical shock hazard. Such a transformer allows connection of electronic instruments or different type of machines, motors, etc. to the electrical power service through a non-metallic path way. Although isolation transformers do in fact reduce macroshock hazards, they have certain disadvantages such as great expense, bulk and the fact that that they do not eliminate the possibility of leakage current in the microshock range.

Moreover, the critical importance of maintaining the integrity of the ground connection between the frame of the hospital bed and the electrical power supply source has led to the development of various expensive protective systems designed to test for an open circuit in the ground connection which do not really overcome the basic problems.

The electrical systems which have been employed heretofore to solve the problems outlined above, have not been fully effective in obtaining a continuous monitoring of the integrity of the ground connection for the frame. They also have limitations on their reliability in immediately detecting an open ground connection and cause the power to be interrupted without endangering medical personnel or patients to electric shock.

Various devices and circuits for the detection and elimination of ground faults have been proposed, some sensing the effective impedance of the system ground and others operating on an unbalance which ground currents may produce. The disadvantage of such detectors lies not only in their unreliability but also in the sensitivity required for detection of small leakage currents which makes them unstable at times, whereby indications of fault occur even under normal operating conditions when no fault exists.

OBJECT OF THE INVENTION

It is therefore the principal object of the present invention to provide an improved hospital bed system wherein the electric shock hazards have been substantially eliminated as a consequence of the continuous verifications of the ground connection integrity of the hospital bed.

It is another object of the instant invention to provide an improved ground circuit monitor of simple and inexpensive construction and operation.

Still another object of the present invention is to provide an economical and convenient method of detecting any problem or trouble in the components of an electrical hospital bed system by insuring that the equipment is always in the safety zone to protect human lives and prevent the advent of dangerous conditions.

Still a further object of the present invention is to provide an automatic cutoff of dangerous current when the safety conditions are not present.

Yet another object of the present invention is to provide a warning device indicating that the potentially dangerous condition should be corrected.

SUMMARY OF THE INVENTION

The foregoing objects are attained according to the present invention by an electric hospital bed system having a ground circuit monitor adapted to interrupt the electric power supply to the components of the hospital bed in the event any segment of the ground wire is broken. This includes the ground line in the wall outlet and any ground connection between the bed frame and the building bus-bar.

The invention provides means for diverting the power supply to a warning device provided either in the bed or in remote central monitoring station which will become operative in case the ground connection is interrupted. The hospital bed will be no longer in operation until the ground fault is located and restored. According to the invention this result is accomplished by passing an infinitesimal or non-lethal control current through the bed frame and through the building ground which controls whether or not the electric power supply can be supplied in a safe condition to operate the components of the hospital bed.

The present invention is hereinafter described with reference to certain illustrations and a description thereof, it being understood, however, that the description and drawings are merely illustrative of the invention and are in no way intended to limit the scope thereof.

BRIEF DESCRIPTION OF THE DRAWINGS

In the drawings:

FIG. 1a is a reduced scale schematic representation of a modification of a portion of the system shown in FIG. 1.

DETAILED DESCRIPTION OF THE INVENTION

Figure 1:
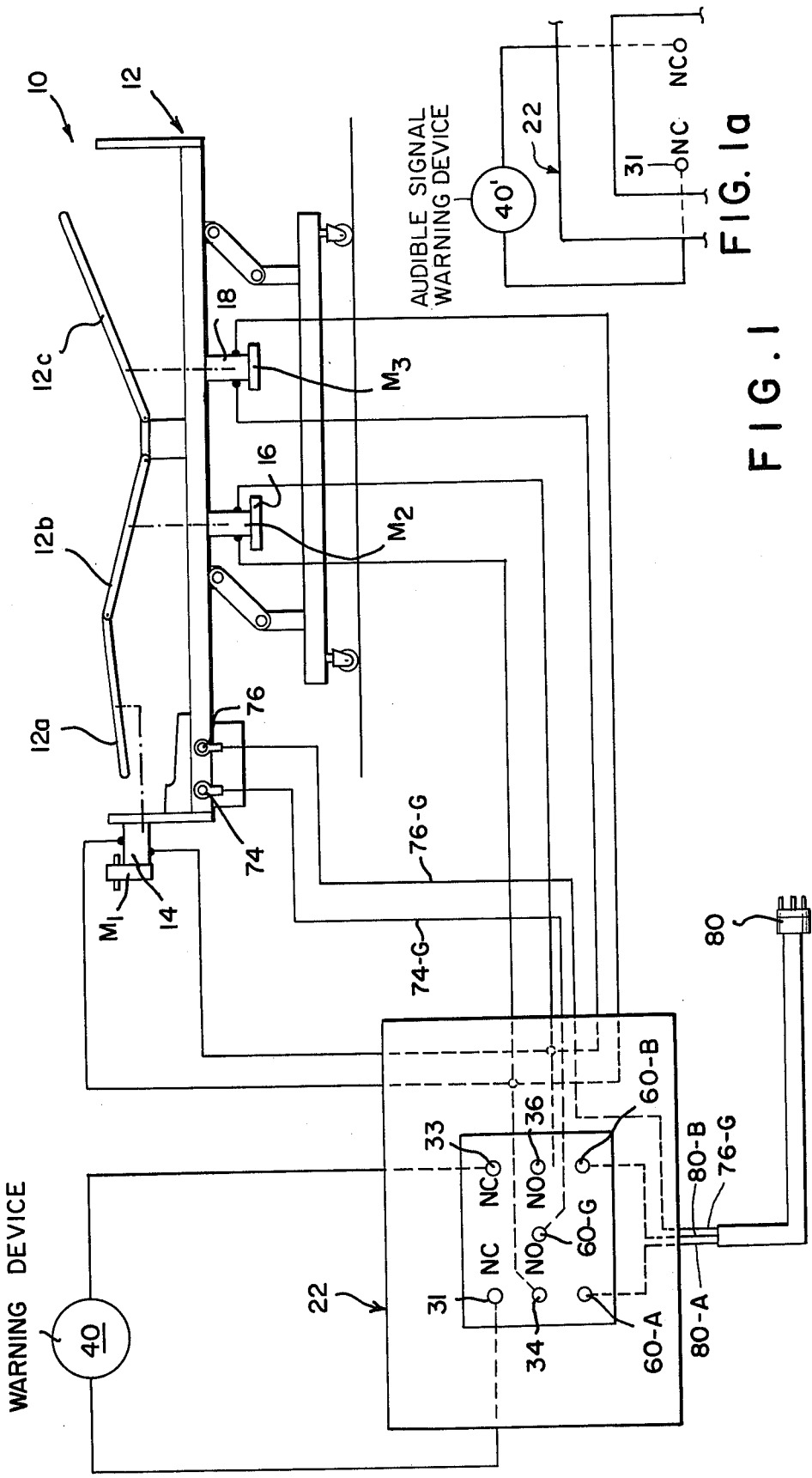
FIG. 1 is a schematic representation of the hospital bed system in accordance with the present invention.

As seen in FIG. 1, the hospital bed 10 according to the invention has a conducting frame 12, which may be formed by a plurality of articulated sections 12a, provided 12b, 12c with a plurality of electric motors 14, 16, 18 operatively connected to respective drive lifting mechanisms 20 to operate the different sections 12a, 12b, 12c.

Figure 3:
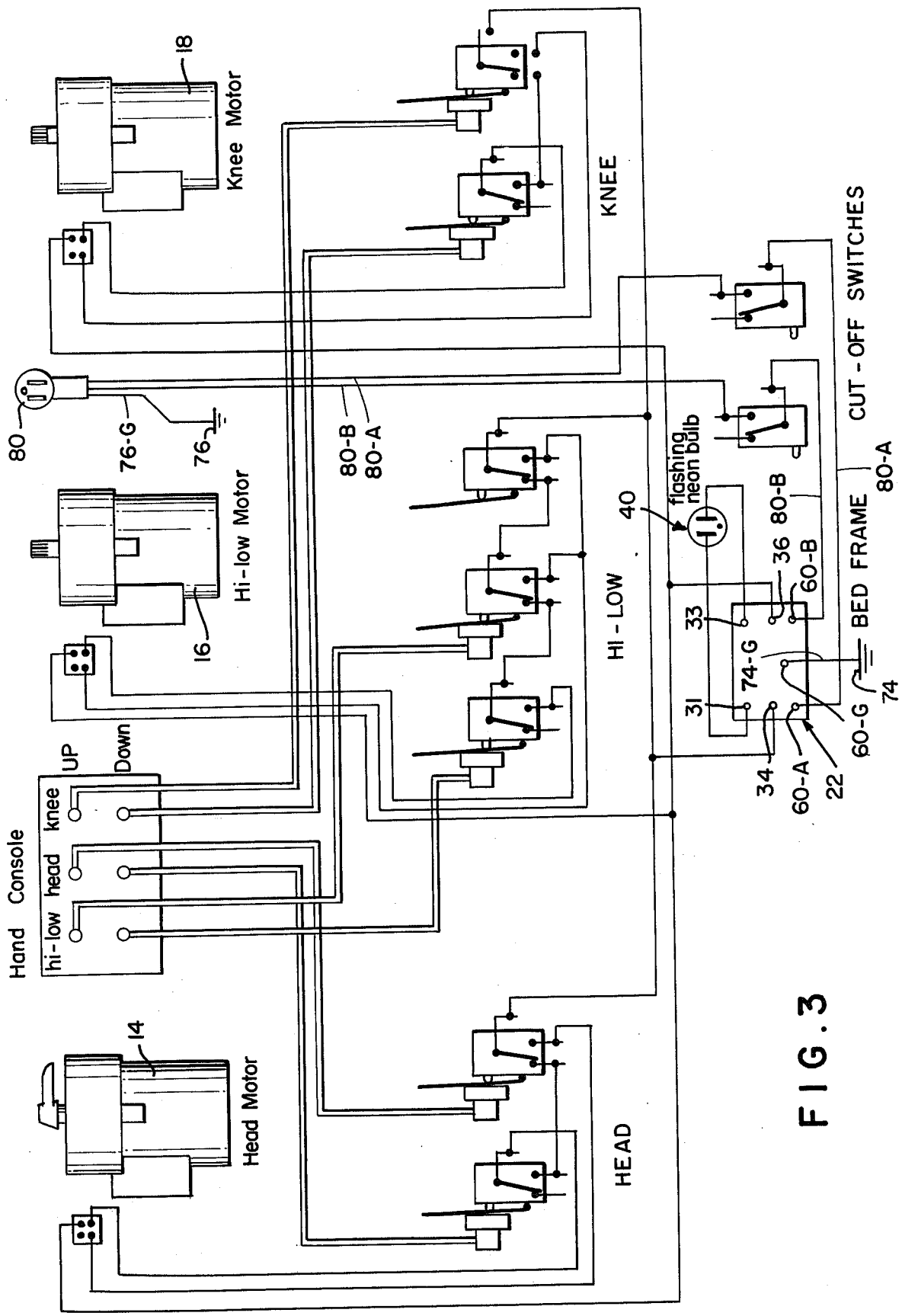
FIG. 3 illustrates a pneumatic and electrical ground monitor circuit of a preferred embodiment of the present invention.

Ground circuit monitor means 22 is provided with the hospital bed system which may be incorporated onto the bed frame 12 in a convenient housing (not illustrated) or it may be installed in a remote monitoring central station. The ground circuit monitor means 22 includes a relay 24 having a coil 26 connected across a printed circuit board 28 and normally closed contacts 31, 33 and normally open contacts 34, 36. A warning device 40 which may be a flashing neon bulb (FIG. 3) or an audible signal (FIG. 1a), is coupled across the normally closed contacts 31, 33. The warning device 40 may be mounted onto the conducting frame 12 or it may be located in a control panel at a remote monitoring central station. The electric motors $M_1$, $M_2$, $M_3$, or motors 14, 16, 18, are connected across the normally open contacts 34, 36 which in turn are operatively associated with the respective drive lifting mechanisms 20 (only one is represented in the block form), capable of operating correspondingly the sections 12a, 12b, 12c of the hospital bed 10 in accordance with the patient or nurse's needs. An off-switch 52 is provided in the circuit to operate the drive lifting mechanism 20 only when a safety condition remains stable in the hospital bed system.

The ground circuit monitor means 22 is provided with a hot terminal 60-A, a neutral terminal 60-B and a ground terminal 60-G. The ground terminal 60-G is coupled to the bed frame at 74 through a lead or conductor 74-G. The hot terminal 60-A is connected to a pivoted blade 63 through a lead 64. The neutral terminal 60-B is connected to a pivoted blade 65 through a lead 66. Both hot, neutral and ground terminals are coupled to the PC Board 28 through leads 68, 70, 72, respectively.

Since the active and passive elements to the printed circuit board 28 do not form part of the present invention, they will not be described in detail. It will suffice to mention that a small part of the current is half-wave rectified and reduced inside the relay 24 and passed out through the terminal 60-G. Because terminal 60-G is fastened at 74 to the metal bed frame 12 which in turn is connected at 76 to the power cord ground line 76-G of the power cord 80, an extremely low current is conducted through the metal bed frame 12, which in turn will therefore be conducted away from the frame through the wall outlet 82 and through the ground 84 of the electrical system of the building. On the other hand, hot terminal 60-A and neutral terminal 60-B are directly connected to the power line 80-A and neutral line 80-B, respectively, of the power cord 80.

In operation, when the hospital bed system is working in a safety condition, an extremely low current (11 microamp.) will flow from terminal 60-A through terminal 60-G to ground 84. This low current serves as a control current for a relay driving transistor in the PC Board 28 (not illustrated), keeping the relay 24 in an energized condition. Thereby, the line current of 120 VAC will emerge from terminals 34, 36 and, when the switch 52 is closed, activate the electric motors, $M_1$, $M_2$, $M_3$, or motors 14, 16, 18 to operate any one of the articulated sections 12a, 12b, 12c of the hospital bed 10.

Figure 2:
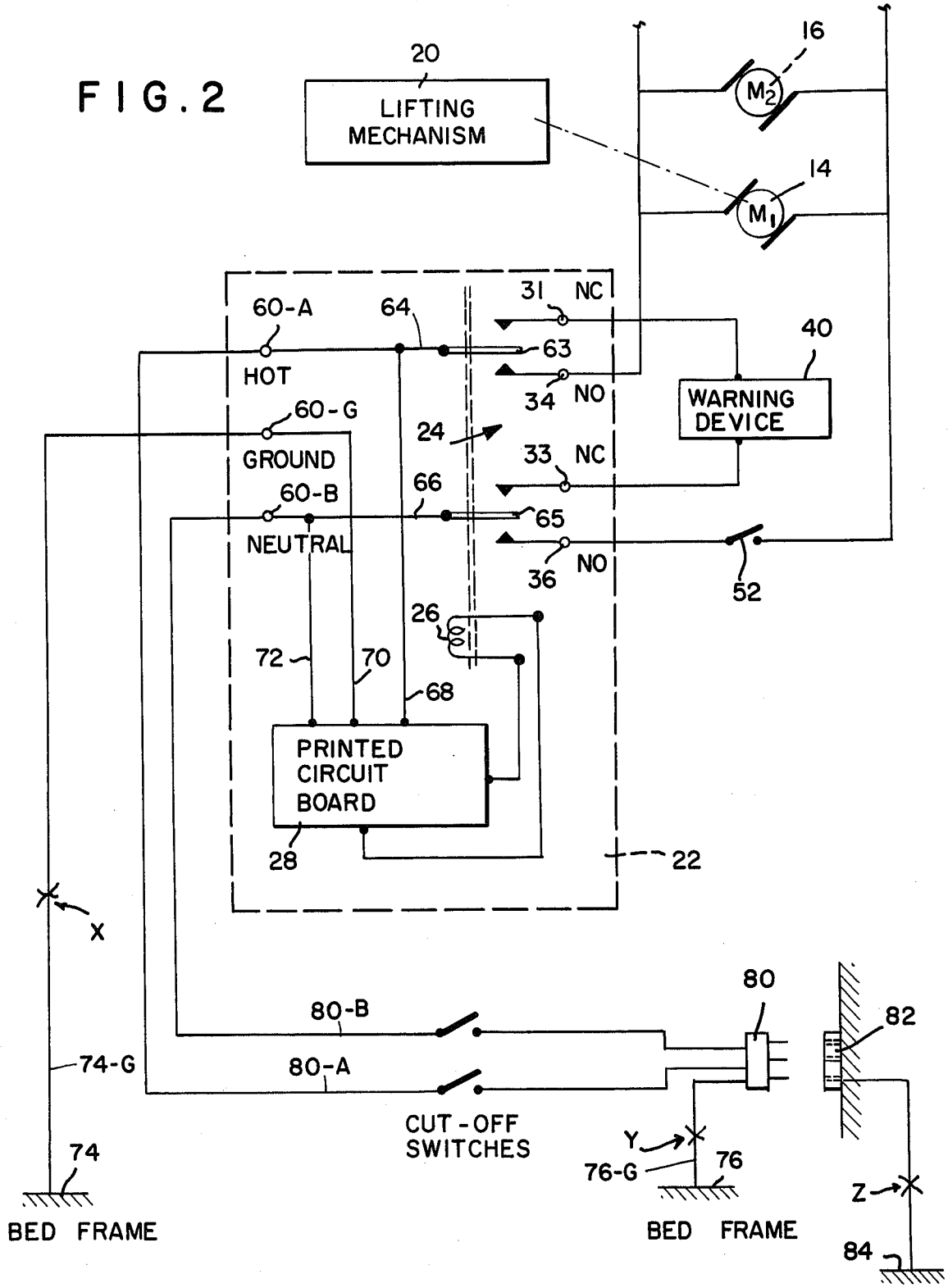
FIG. 2 shows an electric diagram of a simplified hospital bed system showing the principle of the present invention.

In the event that any segment of the ground circuit from terminal 60-G (see FIG. 2 reference numeral X, Y or Z), is broken, including the ground connection at Y in the ground outlet, and any connection between the bed frame and the building ground bus-bar at Z, the relay coil 26 will be deenergized. The line current of 120 VAC will then be diverted through blades 63, 65 from terminals 34, 36 to terminals 31, 33 so that the warning device 40 will be activated. The bed will no longer be operable until the ground loss is located and restored.

As is well known, Underwriters Laboratories, Inc. (U.L.), the National Fire Protection Association (NFPA) and the Association for the Advancement of Medical Instrumentation (AAMI) all propose that the maximum allowable current on the chassis or enclosure of a medical or dental appliance shall be no more than 100 microamperes. They specified this maximum current in the standard operating configuration.

The novel and unique feature of the present invention is not only that the system works with a very low control current that energizes the relay but the ground circuit monitor is designed to filter out the capacitive coupling effect of the steel bed frame. The 60 Hz voltage picked up by the antenna effect of the bed frame cannot cause incorrect actuation of the relay if the ground is broken.

Furthermore, another feature of the present invention is that in case the polarity of the wiring is reversed for any reason, the ground circuit monitor means 22 will also sense this fact and then the warning device will be energized. It is noteworthy that until the present time, electro-medical devices conduct 1.5 to 3.0 milliamperes onto the frame of the appliance. This is potentially extremely hazardous to the patient or to the pesonnel in contact with such devices in the event that a ground fault exists. The system of the present invention reduces the test current by a factor of better than one thousand. The current conducted through the bed frame is less than 25 microamperes. Thus, the system of the present invention provides a safety and reliability factor not heretofore achieved.

The foregoing specification and drawings are solely for the purpose of facilitating and understanding of the present invention whose scope is set forth in the appended claims.

What is claimed is:

1. A hospital bed system comprising:
   an electrically conducting hospital bed frame,
   an electrical device associated with the frame in spatially adjacent disposition thereto and normally maintained out of electrical contact therewith,
   disconnectable coupling means for electrically connecting the electrical device to a power supply source connecting line means having a power line, a neutral line and a ground line,
   means for connecting the frame to the ground in series through the ground line of the power supply source connecting line means, and
   monitor means electrically connected between the power supply source connecting line means and the frame and normally continuously energized by the power supply source for controlling the coupling means to disconnect the electrical device from both the power line and neutral line of the power supply source connecting line means upon interruption of the grounding of the frame.

2. System according to claim 1 wherein the monitor means contains a low drive current network circuit operatively connected between the power line and the ground line, and the frame is connected in series with the low drive current network circuit through the ground line of the power supply source connecting line means, the low drive current network circuit being responsive for controlling the coupling means to disconnect the electrical device upon interruption of the grounding of the frame.

3. System according to claim 2 wherein the coupling means contains a relay and the low drive current network circuit operatively controls the relay to disconnect the electrical device upon interruption of the grounding of the frame.

4. System according to claim 3 wherein the low drive current network circuit is responsive to control the relay at a relay drive current having a value of less than 25 microamperes.

5. System according to claim 3 wherein the system further comprises a warning device and the relay contains normally closed power line and neutral line connecting contacts operatively coupled to the warning device and normally open power line and neutral line connecting contacts operatively coupled to the electrical device.

6. System according to claim 5 wherein the warning device is a means for emitting a flashing neon light.

7. System according to claim 5 wherein the warning device is a means for emitting an audible signal.

8. System according to claim 5 wherein the warning device is disposed at the frame.

9. System according to claim 5 wherein the warning device is disposed at a remote monitoring central station.

10. System according to claim 1 wherein the system further comprises an energizable alternative auxiliary device, the coupling means are alternatively operable for electrically connecting the electrical device and the alternative auxiliary device to the power supply source connecting line means, and the monitor means are responsive for controlling the coupling means simultaneously to disconnect the electrical device from and connect the alternative auxiliary device to both the power line and neutral line of the power supply source connecting line means upon interruption of the grounding of the frame, whereby to divert power from the source to the alternative auxiliary device and away from the electrical device.

11. System according to claim 10 wherein the monitor means contains a low drive current network circuit operatively connected between the power line and the ground line, and the frame is connected in series with the low drive current network circuit through the ground line of the power supply source connecting line means, the low drive current network circuit being responsive for controlling the coupling means simultaneously to disconnect the electrical device from and connect the alternative auxiliary device to both the power line and neutral line of the power supply source connecting line means upon interruption of the grounding of the frame.

12. System according to claim 11 wherein the coupling means contains a relay having normally closed power line and neutral line connecting contacts operatively coupled to the alternative auxiliary device and normally open power line and neutral line connecting contacts operatively coupled to the electrical device, and the low drive current network circuit operatively controls the relay simultaneously to disconnect the electrical device from and connect the alternative auxiliary device to both the power line and neutral line of the power supply source connecting line means upon interruption of the grounding of the frame.

* * * * *